Figure 1:
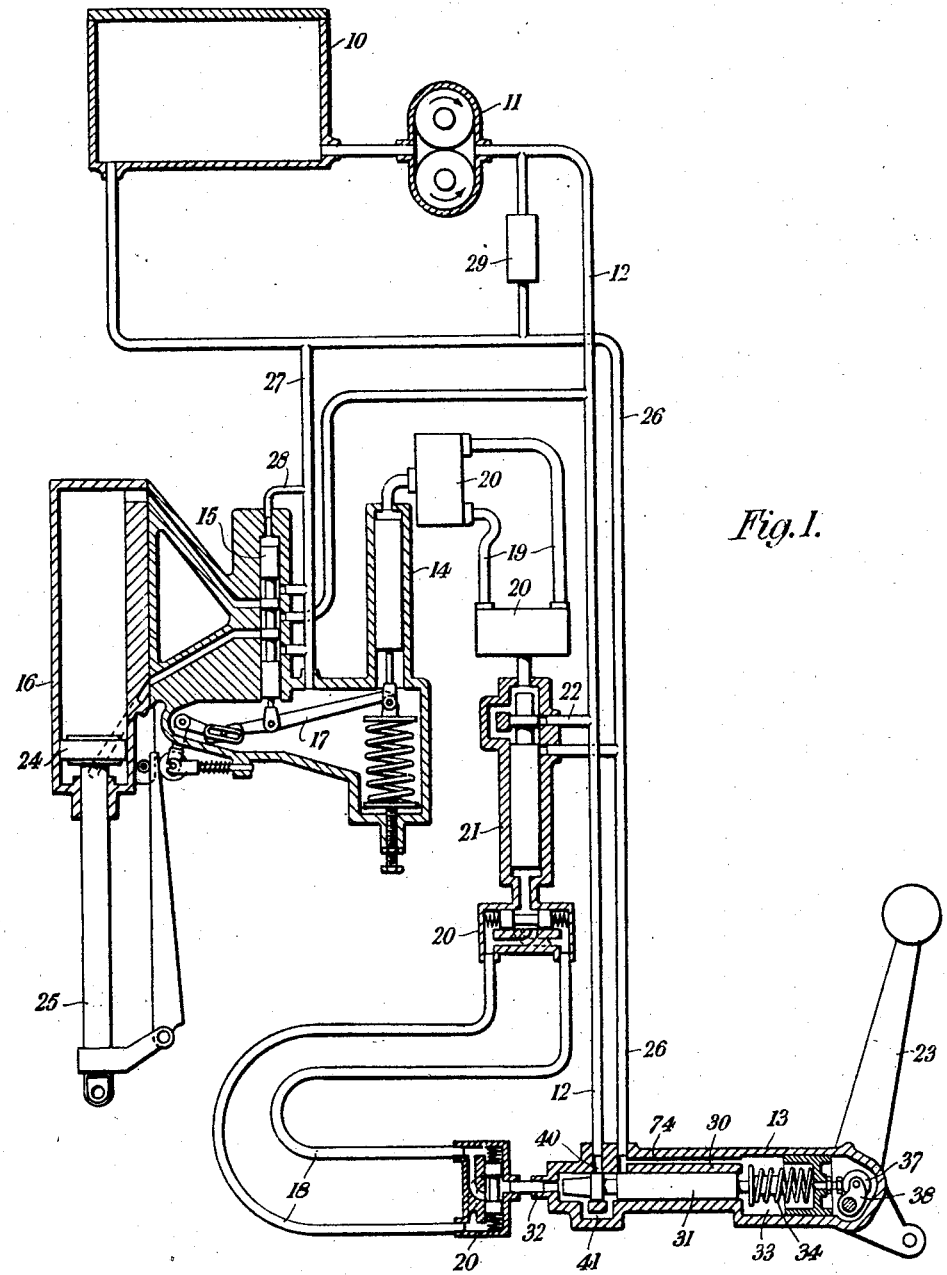

March 21, 1944. E. DODSON 2,344,768
FLUID OPERATED MEANS FOR CONTROLLING APPARATUS AT A DISTANCE
Filed Feb. 18, 1942 3 Sheets-Sheet 1

Inventor
Edward Dodson
By Moses & Nolte
Attys

March 21, 1944. E. DODSON 2,344,768
FLUID OPERATED MEANS FOR CONTROLLING APPARATUS AT A DISTANCE
Filed Feb. 18, 1942 3 Sheets-Sheet 2
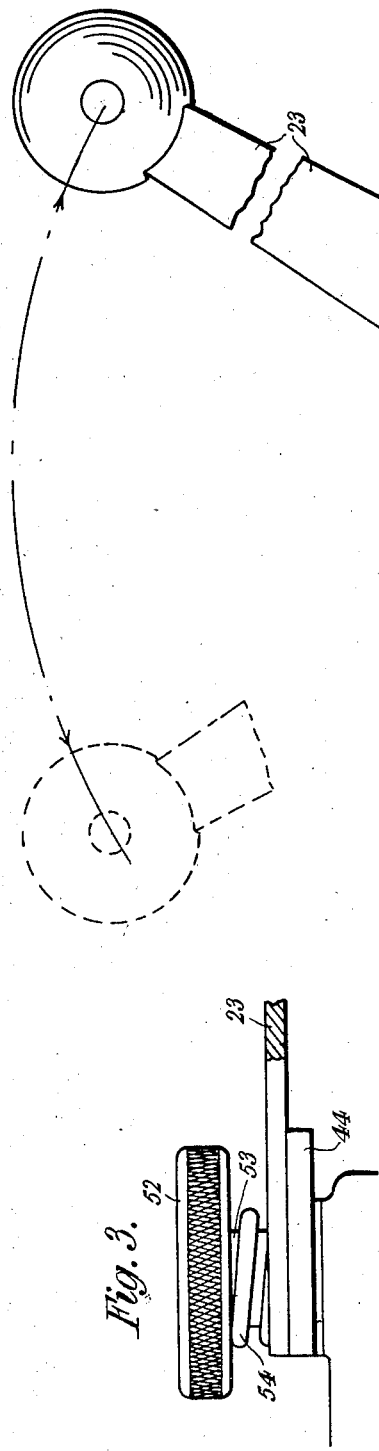
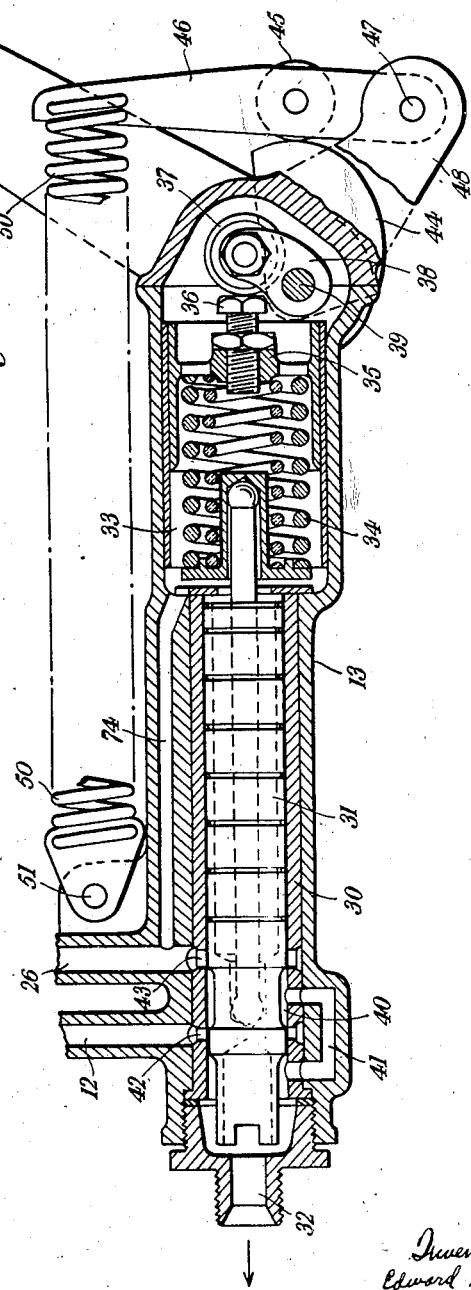
Inventor
Edward Dodson
By Moses & Nolte
Attys March 21, 1944.  E. DODSON  2,344,768
FLUID OPERATED MEANS FOR CONTROLLING APPARATUS AT A DISTANCE
Filed Feb. 18, 1942  3 Sheets-Sheet 3

Inventor
Edward Dodson
By Moses L. Volte
Attys

Patented Mar. 21, 1944

2,344,768

UNITED STATES PATENT OFFICE 2,344,768

FLUID OPERATED MEANS FOR CONTROLLING APPARATUS AT A DISTANCE

Edward Dodson, Puriton, near Bridgwater, England

Application February 18, 1942, Serial No. 431,344
In Great Britain October 1, 1941

5 Claims. (Cl. 303—54)

This invention provides a pressure reducing valve, comprising a cylinder having pressure inlet and exhaust ports, a piston valve in the cylinder having a port connected to an outlet at one end of the cylinder and adapted to be brought into alternative end positions in which it respectively connects the outlet with the inlet port and with the exhaust port, a manual or pedal operating member and a spring interposed between the operating member and the end of the piston valve remote from the outlet, the piston valve being arranged to move from the central position towards the position in which it connects the outlet to the pressure inlet when the spring pressure is increased by movement of the operating member.

If the operating member is moved to increase the spring pressure, pressure will be admitted from the inlet to the outlet, until the pressure at the outlet balances the spring pressure, when the piston will return to its central position and close the inlet. If the operating member is moved to reduce the spring pressure the piston will move in the opposite direction, connecting the inlet to exhaust, until it returns to the central position which it will do when the outlet pressure again balances the spring pressure.

The valve according to the invention is particularly, although not exclusively, intended for use as the sender unit in a fluid-pressure-operated remote control system of the kind, described for example in British Patent No. 483,049, comprising a sender unit at one station, a receiver unit at a distant station, a pipe line connecting the two units, a control device at the first station coupled to the sender unit, and an apparatus at the distant station coupled to the receiver unit and arranged to be operated, in accordance with the setting of the control device, by fluid pressure transmitted through the pipe line to the receiver unit under the control of the sender unit. The valve, though intended mainly for use with hydraulic pressure, is also capable of use with compressed air.

It will be appreciated that it is essential for the piston valve to move with as little friction as possible, and therefore glanding is inadvisable. Therefore, some leakage of fluid will occur into the spring chamber, and unless vented would cause an hydraulic lock. It will usually be inconvenient to allow this leakage to spill out into the open; and a connection may therefore be provided between the spring chamber and exhaust to allow the leakage to drain away. It is preferred however, to provide a pump actuated by a valve-operating member for evacuating this leakage back to the exhaust system or the fluid supply vessel.

Figure 4:
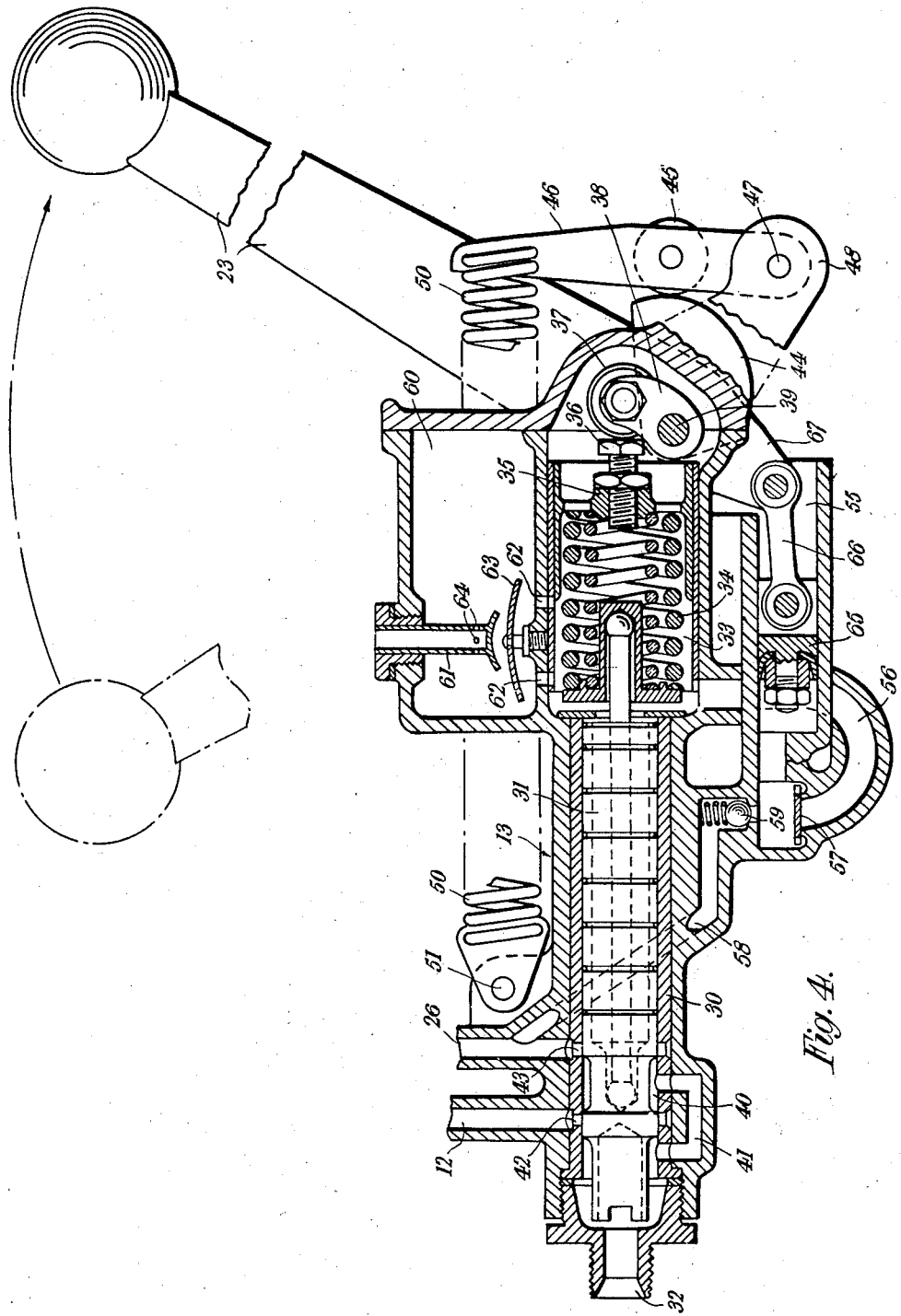

Two alternative forms of hydraulic sender unit according to the invention will now be described in further detail, by way of example, with reference to the accompanying drawings, in which:

Fig. 1 is a diagram showing a hydraulic remote control system embodying a sender unit according to the invention, Fig. 2 is a longitudinal section on an enlarged scale through the sender unit shown in Fig. 1, Fig. 3 is a plan view showing a damping device secured to the handle of the sender unit, and Fig. 4 is a view, similar to Fig. 2, of an alternative form of sender unit.

The hydraulic system shown in Fig. 1 comprises a reservoir 10 to contain oil, a pump 11, serving to pump the oil via a pipe 12 to a sender unit 13, the details of which are fully described below, and a receiver unit 14, relay valve 15, servomotor 16 and follow-up gear 17 the details of which are fully described in my copending United States application Serial No. 431,345.

The sender unit 13 is connected to the receiver unit 14 by a pipe line consisting of two duplicated sections 18, 19. At each end of each duplicated section of the pipe line is located a cut-out valve 20 constructed as described in my copending United States application Serial No. 419,719, now abandoned, these cut-out valves serving to cut-off the supply of pressure fluid from a broken or damaged pipe in either section of the duplicated line. Between the two duplicated sections of the line is disposed a relay valve 21, the construction of which is fully described in my copending United States application Serial No. 431,343. This relay valve 21 serves, when required, to boost up the pressure in the portion 19 of the pipe line connected to the receiver unit 14 by pressure tapped direct from the pressure line 12 through a branch pipe 22, and at the same time preserves an equal pressure in the two portions 18, 19 of the pipe line.

The receiver unit 14 takes up a position determined by the position of the actuating handle 23 of the sender unit, and causes the piston 24 of the servomotor 16 to take up a corresponding position. The apparatus to be remotely controlled is connected to the piston rod 25, and its setting is therefore determined by the setting of the actuating handle 23 of the sender unit.

The pressures on the non-operating ends of the transmitter and receiving elements in the sender and receiver units are balanced by connecting them to exhaust by pipes 26, 27 respectively. The two ends of the relay valve 15 controlling the servomotor are likewise exposed to the same balancing pressure by means of the pipes 27, 28. A relief valve 29 connects the pipes 12 and 26.

The sender unit shown in Fig. 2 comprises a cylinder 30 in which is disposed a piston valve 31. The outlet 32 at one end of the cylinder is connected to the pipe line 18 leading to the receiver unit. The other end of the cylinder communicates with the spring chamber 33, in which is disposed a spring 34 which is held in compression between the end of the piston 31 and a plate 35 carrying on its outer surface a tappet 36 bearing against a roller 37 carried on the end of an arm 38 fixed to a spindle 39 extending through the spring chamber in a direction transverse to the axis of the cylinder. On this spindle 39 is fixed the operating handle 23 so that pivotal movement of the handle 23 will vary the compression of the spring 34.

The piston valve 31, near the outlet end, has an annular groove 40 which is in permanent communication with a passage in the cylinder wall 41 leading to the outlet 32. Normally, i. e. when the pressure at the outlet balances the pressure of the spring, the piston is maintained in a central position in which its groove lies between but communicates with neither of a pair of ports 42, 43 in the cylinder wall, the port 43 nearer the spring communicating with the exhaust line 26 and that 42 nearer the outlet communicating with the pressure line 12. One movement of the handle to increase or decrease the spring pressure, the piston valve will move accordingly to bring its groove 40 into communication with the pressure or exhaust port 42 or 43 as the case may be, until the pressure at the outlet has risen or fallen to the extent required to balance the new spring pressure, when the piston valve will return to the central position.

It will be appreciated that the spring 34 will exert a reaction on the handle 23 tending to return it to the neutral position. Various means may be provided for holding the handle in any position to which it is adjusted, for example a series of detents in a quadrant. It is preferred however, as illustrated, to fit the handle with a cam 44 operating on a roller 45 carried by a lever 46 pivoted at 47 to a fixed bracket 49. The free end of the lever 46 is connected to a second spring 50, the opposite end of which is fixed at 51. The spring 50 produces on the handle 23 a reaction equal and opposite to that produced by the spring 34 and so retains the handle in any position to which it is set. The handle is also provided with a damping device which assists the spring 50 to retain it in any position to which it is adjusted, the damping device being constituted by a knob 52 (Fig. 3), fitted on a boss 53 on which the handle pivots, and a spring 54 held in compression between the knob and the handle.

A passage 74 is provided for the purpose of allowing fluid which may leak past the piston 31 to escape to exhaust from the spring chamber 33.

The sender unit shown in Fig. 4 is generally similar to that shown in Fig. 2, except that it is fitted with a pump for returning leakage fluid from the spring chamber to exhaust and also with a special air vent.

Beneath the spring chamber 33 is a pump cylinder 55, which communicates at the end remote from the handle with the spring chamber 33 through a passage 56 controlled by a plate valve 57, and with the exhaust line 26 through a passage 58 controlled by a ball valve 59. Above the spring chamber is a vent-chamber 60 having an air vent, constituted by a tube 61 depending into the vent-chamber and located directly above passages 62 connecting the vent-chamber with the spring chamber. Above the passages 62 is mounted a deflector plate 63 which, in case of the apparatus being turned upside down, as it might well be if installed in an aircraft, prevents unevacuated leakage in the spring chamber from spilling into the holes 64 in the tube 61 and so escaping through the air vent. Such leakage would be flung against the top surface of the vent-chamber 60 and trapped there so that it cannot flow out of the vent tube.

The piston 65 of the pump for evacuating leakage from the spring chamber is connected by a link 66 to a downward extension 67 on the operating handle 23 so that as the handle is moved to and fro the piston 65 will be reciprocated in the pump cylinder 55 and so caused to pump leakage through the valve-controlled passage 58 to exhaust, the non-return valve 59 in the passage serving to prevent back flow of liquid from exhaust.

A fluid-pressure-operated remote control system of the kind referred to, including as its sender unit a pressure reducing valve according to the invention, has the advantage that it is immune from the effects of temperature changes in the operating fluid, by reason of the fact that the piston of the sender unit reacts to the fluid pressure against its spring, and will relieve the pressure fluid in the pipe line to exhaust in the event of thermal expansion of the fluid and admit pressure fluid to the pipe line in the event of thermal contraction of the fluid.

What I claim as my invention and desire to secure by Letters Patent is:

1. A pressure reducing valve comprising a cylinder having inlet and exhaust ports and an outlet, a piston valve in the cylinder exposed at one end to the fluid pressure at the outlet and operable by movement in opposite directions from a neutral position to place the outlet in communication with the inlet port and with the exhaust port respectively, a chamber communicating with the end of the cylinder remote from the outlet, a spring in said chamber for balancing the piston valve against the pressure at the outlet and thereby urging it in its neutral position, a pump cylinder communicating with said chamber, a plunger in said pump cylinder, a valve-controlled connection from the pump cylinder to exhaust, a pivoted operating member for varying the compression of the spring for the purpose of displacing the piston valve to raise or lower the pressure at the outlet, and a link connecting the operating member and the plunger, and serving to reciprocate the plunger on actuation of the operating member, thereby expelling to exhaust leakage fluid in the chamber.

2. A pressure reducing valve comprising a cylinder having inlet and exhaust ports and an outlet, a piston valve in the cylinder exposed at one end to the fluid pressure at the outlet and operable by movement in opposite directions from a neutral position to place the outlet in communication with the inlet port and with the exhaust port respectively, a chamber communicating with the end of the cylinder remote from the outlet, an air vent at the top of said chamber, a deflector for hindering escape of leakage fluid from the chamber through the air vent in the event of the apparatus being turned upside down, a spring in said chamber for balancing the piston valve against the pressure at the outlet and thereby urging it in its neutral position, and an operating member for varying the compression of the spring for the purpose of displacing the piston valve to raise or lower the pressure at the outlet.

3. A pressure reducing valve comprising a cylinder having inlet and exhaust ports and an outlet, a piston valve in the cylinder exposed at one end to the fluid pressure at the outlet and operable by movement in opposite directions from a neutral position to place the outlet in communication with the inlet port and with the exhaust port respectively, a chamber communicating with the end of the cylinder remote from the outlet, a spring in said chamber for balancing the piston valve against the pressure at the outlet and thereby urging it in its neutral position, a pivoted operating member, a member carried thereby and operative on pivotal movement of the operating member, to vary the compression of the spring and displace the piston valve to raise or lower the pressure at the outlet, and a spring balancing device for balancing the reaction on the operating member of the spring associated with the piston valve, said spring balancing device comprising a tension spring anchored at one end, a link connected to the other end of the tension spring, and a cam carried by the operating member and arranged to displace the link in the direction to increase the tension of said tension spring on movement of the operating member to reduce the compression of the spring associated with the piston valve.

4. Apparatus as claimed in claim 3, comprising a damping device for assisting the spring-balancing device to retain the operating member in any position to which it is set, said damping device comprising a spring surrounding the pivot of the operating member and held in compression against the surface of the operating member.

5. A pressure regulating valve comprising a cylinder having inlet and exhaust ports and an outlet port, a piston valve in said cylinder movable into control position to establish communication between said outlet port and either said inlet or exhaust port according to the position of said piston valve, an operating member, a chamber communicating with said cylinder on a side of said piston valve opposite said ports, connecting means between said operating member and said piston valve in said chamber, whereby said piston valve is moved into selective control position upon movement of said operating member, and pump means separate from said piston valve and actuated by movement of said operating member for evacuating leakage fluid from said chamber.

EDWARD DODSON.